Figure 3:
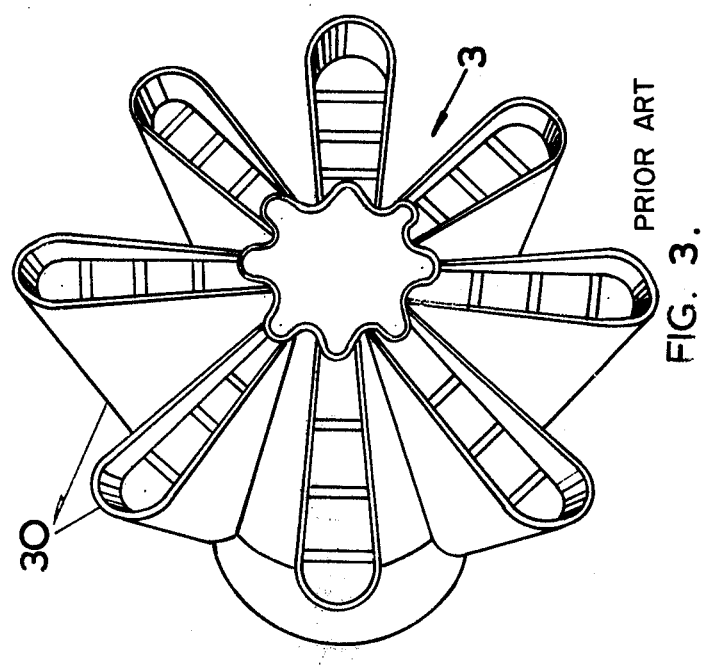

United States Patent [19]

Bryce et al.

[11]  3,927,522

[45] Dec. 23, 1975

[54] AIRCRAFT GAS TURBINE NOISE SUPPRESSION

[75] Inventors: William Dean Bryce; Richard Alfred Pinker, both of Farnham; Brian Arthur Turner, Aldershot, all of England

[73] Assignee: The Secretary of State for Defense in Her Britannic Majesty's Government of the United Kingdom of Great Britain & Northern Ireland, London, England

[22] Filed: Dec. 17, 1973

[21] Appl. No.: 425,235

[30] Foreign Application Priority Data

Dec. 18, 1972 United Kingdom............... 58304/72

[52] U.S. Cl. ..................... 60/264; 60/262; 60/271; 181/33 HB; 181/33 HC; 239/265.13
[51] Int. Cl.².... F02K 3/04; F02K 3/02; E04B 1/99; B64D 33/04
[58] Field of Search.................... 239/127.3, 265.13; 181/33 HB, 33 HC, 33 HD; 60/232, 264, 271

[56] References Cited
UNITED STATES PATENTS 3,055,174   9/1962   Grotz et al........................... 60/35.6
3,409,228   11/1968  Mehr ................................. 239/127.3
3,587,973   6/1971   Wolf et al....................... 239/265.13
3,612,209   10/1971  Vdoviak et al................. 181/33 HC
3,693,880   9/1972   Verusaw et al.................. 239/127.3

Primary Examiner—C. J. Husar
Assistant Examiner—Thomas I. Ross
Attorney, Agent, or Firm—Cameron, Kerkam, Sutton, Stowell & Stowell

[57]  ABSTRACT

In an aircraft gas turbine installation having a jet pipe which extends downstream of the turbine by a distance at least equal to the jet pipe nozzle diameter, a plurality of moveable members are mounted in the jet pipe. The members usually lie parallel to the centerline of gas flow through the pipe but, when it is desired to suppress noise, can be moved into positions where they provide a serrated restriction to flow through the pipe. The members are preferably mounted on the jet pipe, to lie usually flush with the jet pipe. Alternatively the members may be mounted on struts connecting the jet pipe to a bullet downstream of the turbine.

4 Claims, 8 Drawing Figures

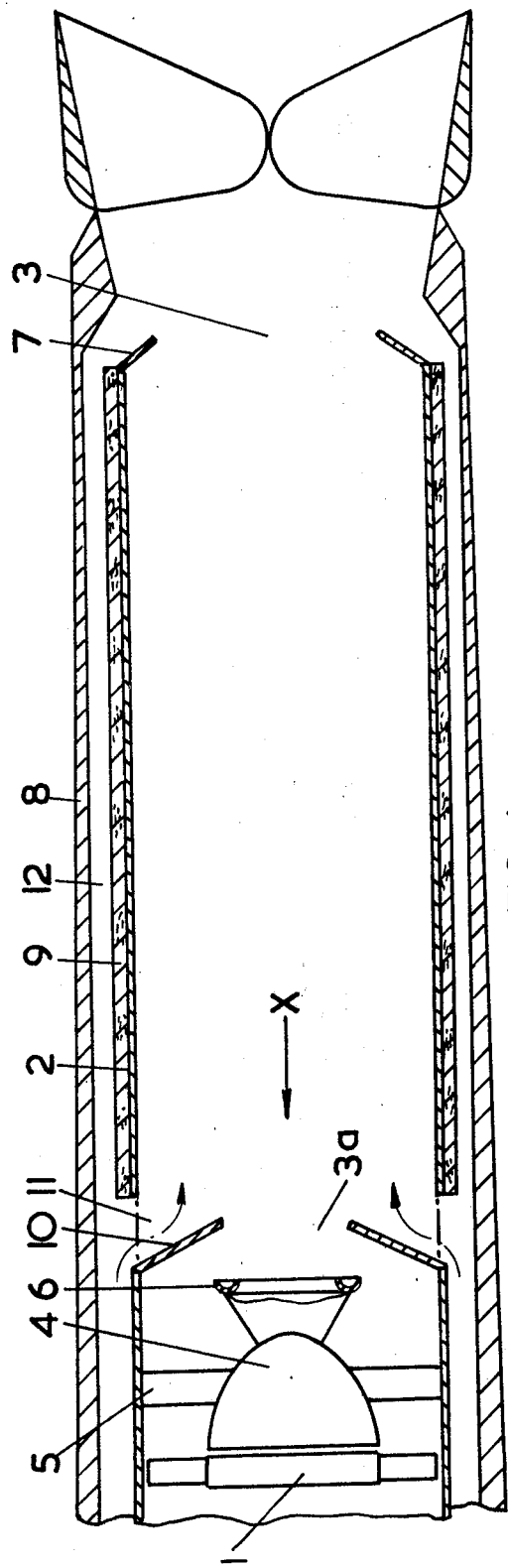
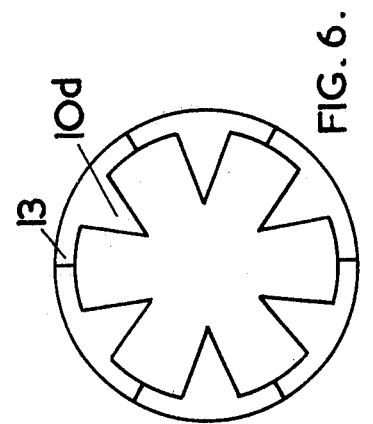
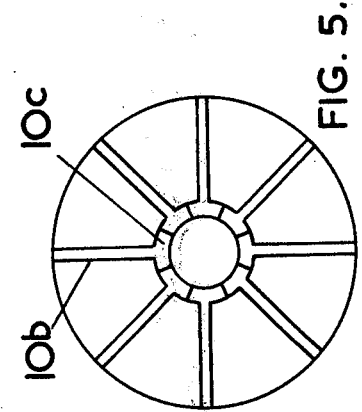
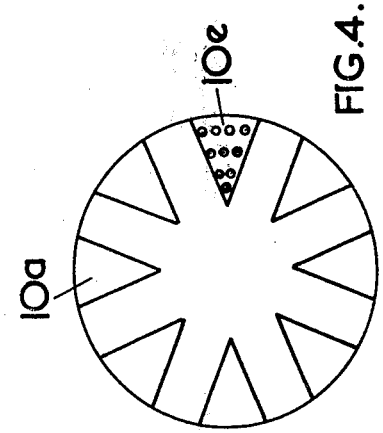
FIG. 1.
FIG. 4.
FIG. 5.
FIG. 6.

AIRCRAFT GAS TURBINE NOISE SUPPRESSION

The present invention relates to noise reduction of aircraft gas turbine engine exhausts.

The regulations regarding allowable noise levels from aircraft gas turbine engines are becoming increasingly stringent. Whilst efforts are being made to meet these regulations by the development of new types of engine, for example the type of engines known as fan-jets, it is desirable, and in some cases necessary to reduce the noise made in certain conditions by engines currently in use or at a late stage of development. Some methods of noise reduction, such as the throttling-back of engines during climb after take-off, reduce operating safety margins. Other methods result in a loss of efficiency which affects an engine throughout its entire operating range in spite of the fact that the noise reduction is only required over a small portion of that operating range.

The present invention provides a means of gas turbine exhaust noise reduction which is particularly applicable to gas turbine engines of the type wherein the lengths of jet pipes which extend aft of the turbines are large in comparison with the diameters of the jet pipe nozzles.

According to the present invention a gas turbine engine jet pipe of the type wherein the ratio between the length which, when the pipe is installed on an engine, will extend behind a turbine and the nozzle diameter is at least 1/1 has, at a position which, when the jet pipe is installed on an engine, will be adjacent to the turbine, a plurality of members moveable between positions where they lie parallel to the centerline of gas flow when the engine is running and positions where they extend into the local gas flow to form a serrated restriction to flow through the jet pipe.

The members are preferably mounted on the jet pipe moveable between positions flush with the jet pipe and positions where they extend inwardly into the jet pipe.

According to one form of the invention members may be included which, when extended, form a continuous restriction to flow through the jet pipe.

In another form of the invention provision is made for entrainment of air from outside the jet pipe to the downstream side of the members when they are extended with the jet pipe installed on an operating engine.

The terminology used herein; some factors contributing to gas turbine engine exhaust noise and some of the known methods for reducing the noise; the means whereby the present invention can be used to reduce the noise; and some embodiments of the invention, which are included by way of example only, can best be described with reference to the following diagrammatic drawings, of which:-

Figure 2:
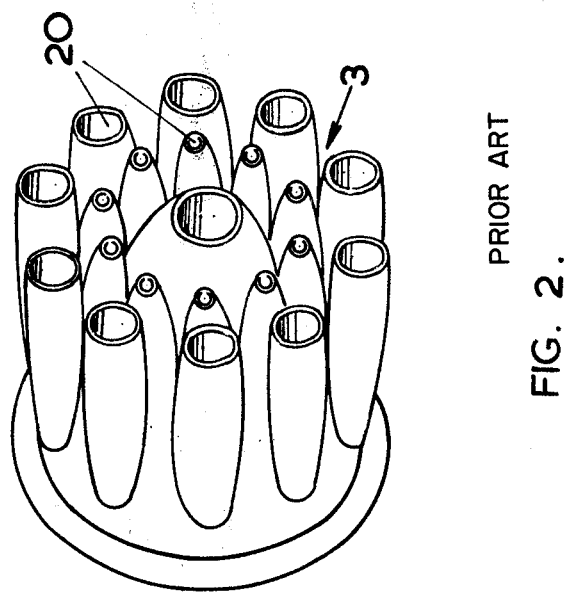
Figure 7:
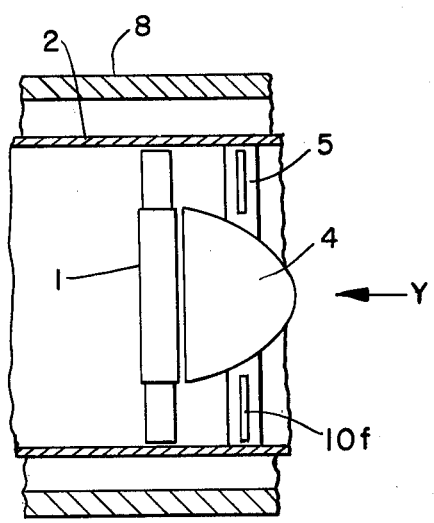
Figure 8:
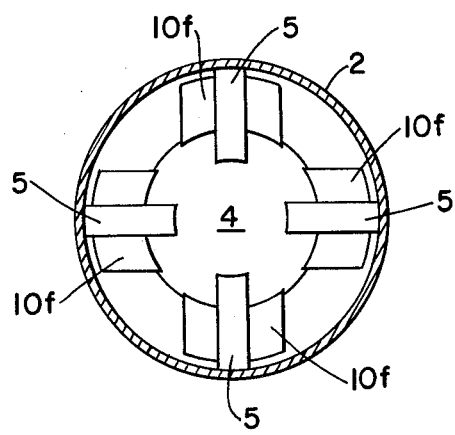

FIG. 1 shows a side view of the turbine and jet pipe section of a gas turbine engine, FIGS. 2 and 3 show two known types of nozzle which have been developed to reduce exhaust noise, FIGS. 4, 5 and 6 are end views, in the direction of arrow X in FIG. 1, of three jet pipes with embodiments of the invention, and FIG. 7 is a side view of the turbine and part of the jet pipe section of a modified form of gas turbine engine embodying the invention, and FIG. 8 is an end view, in the direction of arrow Y, of the jet pipe of FIG. 7.

A turbine and jet pipe section of a gas turbine engine (FIG. 1) in their simplest form include a turbine 1 and a jet pipe 2 having a nozzle 3. To assist in obtaining a smooth diffusion of the gas flow into the jet pipe, there is usually a bullet 4 aft of the turbine. Whilst in some engines the bullet 4 could conceivably rotate with the turbine 1 it is usually secured to the engine structure by struts such as that shown at 5 and often serves as a bearing housing. The length of the jet pipe 2 depends in general on the type of installation of the engine on an aircraft. For example the jet pipes of podded engines can be relatively short whilst those of engines installed in a fuselage or wing root are usually relatively long. When an engine incorporates a reheat facility, however, its jet pipe must be relatively long to allow adequate combustion to take place. A reheat stabiliser ring is shown at 6 in FIG. 1.

It is a known fact in the art that the minimum area (known as the nozzle 3) of the jet pipe 2 must be downstream of the turbine 1 and that conditions at the nozzle 3 affect the whole operation and efficiency of the engine. For increased efficiency over a range of engine operating conditions it is common practice to have means for varying the area of the nozzle 3 using moveable members, frequently referred to as petals, such as those shown at 7 in FIG. 1.

One of the factors known to affect the noise from an engine is the effective diameter of the nozzle. One known method of reducing the noise is to use the configuration shown in FIG. 2 where the nozzle 3 consists of a plurality of tubes 20. Another method (FIG. 3) uses a nozzle 3 which has a plurality of lobes 30. This results in an effect similar to that of the method of FIG. 2. Both these methods involve a weight and drag penalty which affects an aircraft on which such an engine is installed at all operating conditions.

Another way of reducing noise is by shielding the nozzle efflux for some distance downstream of the nozzle 3. However, to be effective the shielding must extend for a considerable distance downstream of a nozzle 3, perhaps as many as ten nozzle diameters. Whilst many modern engines have for a variety of reasons an outer pipe, such as that shown at 8 in FIG. 1, extending to or to just downstream of the nozzle 3, it will be appreciated that extension of a pipe 8 for a distance of the above order would be inordinately punitive in terms of weight and drag for an aircraft installation.

Other sources of noise originate within the engine and this 'internal' noise propagates through the jet pipe 2. Noise from such sources (as, for example, turbine noise) emanate substantially radially from the end of jet pipe 2 and although sometimes of a lower level than the noise from the jet efflux can be annoying to populations below or to the side of an aircraft's flight path. It is thought that this type of noise source can also originate from the action of the local gas flow on various parts of the jet pipe structure. The jet pipe may be surrounded by a layer of noise absorbent material, as illustrated at 9 in FIG. 1, to lessen noise from these types of source.

Considering the engine illustrated in FIG. 1 a plurality of members such as that shown at 10 are arranged to be flush with the jet pipe 2 when the engine is operating under conditions where noise reduction procedures are unnecessary. Means such as hydraulically or pneumatically operated rams are connected to the members 10 so that operation of the means rotates the members 10 inwardly (henceforth referred to as closing the members 10). Thus the members 10 adjacent the turbine 1 upstream of the nozzle 3 are movable between positions corresponding to normal flight conditions where they lie parallel to the centerline of gas flow through the pipe 2 and positions where they extend at an angle to the gas flow to form a serrated restriction to flow through the pipe 2; said members 10 when not extended forming a secondary nozzle 3a of larger area normal to flow therethrough than the area normal to flow through the nozzle 3 and when extended forming a secondary nozzle 3a of smaller area normal to flow therethrough than the area normal to flow through the primary nozzle 3 so that conditions at the secondary nozzle and not conditions at the primary nozzle affect the operation and efficiency of the engine and so that the gas flow through the secondary nozzle is substantially divided into a plurality of separate flow streams, the jet pipe 2 downstream of the secondary nozzle becoming a shield for noise emanating from the secondary nozzle 3a. Two possible shapes of member 10 are shown in FIG. 4, where the members 10a are substantially triangular in form, and FIG. 5 where the members 10b are substantially T-shaped in form and so disposed that in the closed position the cross members 10c form an annular ring within the jet pipe 2.

It should be appreciated that the invention as described with reference to FIG. 1 can only be used with reheat inoperative. In operation, the members 10 are moved to the closed position, so effectively reducing the cross-section of the jet pipe 2 in the region of the members 10. At the same time, or subsequently, the petals 7 are moved to the open position so that the narrowest cross-section of the jet pipe 2, a secondary nozzle 3a, is in the region of the members 10. The jet pipe 2 then becomes a shield for noise emanating from the nozzle 3a. The shielding effect of the jet pipe 2 is increased by the serrated configuration of the nozzle 3a causing an effect similar to that of splitting the nozzle 3a into a plurality of smaller separate nozzles. In addition the sound-absorbent lining 9 of the jet pipe 2 will not only be effective in reducing 'internal' noise but also in reducing the jet noise generated by the jets issuing from the nozzle 3a.

Projection of the members 10 into the jet efflux will result in areas of low pressure forming on the downstream sides of the members 10, and this will cause an adverse drag effect. This drag effect can be combatted by entraining air from the atmosphere or, as illustrated, from a passage 12 between the jet pipe 2 and the pipe 8 and allowing it to flow into the low pressure areas, as illustrated at 11 in FIG. 1. The advantages of this procedure must be offset against the additional mechanical complication involved. The passage 12 must remain sealed from the jet pipe 2 until the jet pipe 2 nozzle position has moved from the nozzle 3 to the secondary nozzle 3a, otherwise hot high pressure gas from within the jet pipe 2 will flow into the passage 12 with potentially dangerous results.

In another embodiment of the invention (FIG. 6) secondary petals 13, similar to the petals 7, are used in conjunction with members 10d such that the secondary nozzle 3a includes a continuous restriction and a serrated restriction. The petals 13 can be separate from or integral with the members 10d. With this embodiment, using air entrainment and suitable detail design a layer of relatively slow moving air may be induced to flow over the inner surface of the jet pipe 2, thus reducing any noise generated by the high-speed gas flow over the inner surface of the jet pipe 2.

It should be appreciated that, whilst the members 10 as illustrated are substantially flat plates, it may be advantageous to aerodynamically shape one or both surfaces. It might also be advantageous to have performations in the members 10, as illustrated at 10e in FIG. 4, or to coat the downstream surfaces of the members 10 with noise absorbent material. Such detail design, choice of shapes, number, distribution, and angle relative to the local gas flow in the closed position of the members 10, and presence or absence of air entrainment, will depend on a particular application of the invention. Such factors as basic engine noise, degree of noise reduction required, loss of engine power acceptable, and mechanical complication of possible embodiments, must all be taken into consideration.

Whilst the embodiments of the invention described have been related to the relatively complicated jet pipe illustrated in FIG. 1, the invention is also applicable to simple installations. To allow the maximum length of jet pipe 2 to be utilised as a noise shield and absorber the members 10 should be situated as close as possible to the turbine 1. For this reason, and for mechanical simplicity, the members 10 might be, for example, moveable members 10f on the struts 5 as shown in FIGS. 7 and 8. In an engine with reheat, however as illustrated in FIG. 1, engineering considerations indicate that the members 10 will have to be installed downstream of the reheat stabiliser 6.

The effect of the members 10 may be amplified or substituted for by streams of gas injected at an angle into the jet efflux.

It will be appreciated from the above description of embodiments of the invention and of the way in which they work that the ratio of jet pipe length aft of the turbine to the jet pipe nozzle diameter must be appreciable, at least of the order of 1/1. Attempts to use the invention with ratios less than this might result in an increase in noise. As the ratio of jet pipe length to nozzle diameter increases the beneficial effects of the invention can be expected to increase, at least up to a point.

What we claim is:

1. A gas turbine engine comprising a turbine; a jet pipe extending downstream of the turbine and terminating in a primary nozzle, conditions at which affect the operation and efficiency of the engine in normal flight conditions, the length of the jet pipe downstream of the turbine being at least equal to the primary nozzle diameter; and a plurality of members adjacent the turbine upstream of said primary nozzle and moveable between positions corresponding to normal flight conditions where they lie parallel to the centerline of gas flow through the pipe and positions where they extend at an angle to the gas flow to form a serrated restriction to flow through the pipe, said members when not extended forming a secondary nozzle of larger area normal to flow therethrough than the area normal to flow through said primary nozzle and when extended forming a secondary nozzle of smaller area normal to flow therethrough than the area normal to flow through said primary nozzle so that conditions at the secondary nozzle and not conditions at the primary nozzle affect the operation and efficiency of the engine and so that the gas flow through the secondary nozzle is substantially divided into a plurality of separate flow streams, the jet pipe downstream of the secondary nozzle becoming a shield for noise emanating from the secondary nozzle.

2. A gas turbine engine as claimed in claim 1 wherein said members are mounted on said jet pipe and are moveable between positions where they lie flush with said jet pipe and positions where they extend into the gas flow.

3. A gas turbine engine as claimed in claim 2 wherein the jet pipe is provided with apertures through which external air may enter the jet pipe, said apertures being normally closed by said members and being opened when said members are moved to positions where they extend at an angle to the gas flow through the pipe.

4. A gas turbine engine as claimed in claim 1 further comprising a bullet downstream of said turbine and struts connecting the bullet to said jet pipe, said members being mounted on said struts.

* * * * *